(12) United States Patent
Kim (10) Patent No.: US 11,402,878 B2
(45) Date of Patent: Aug. 2, 2022

(54) DISPLAY DEVICE

(71) Applicant: LG ELECTRONICS INC., Seoul (KR)

(72) Inventor: Hohyung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/252,868

(22) PCT Filed: Nov. 1, 2018

(86) PCT No.: PCT/KR2018/013189
§ 371 (c)(1),
(2) Date: Dec. 16, 2020

(87) PCT Pub. No.: WO2020/091110
PCT Pub. Date: May 7, 2020

(65) Prior Publication Data
US 2021/0116976 A1    Apr. 22, 2021

(51) Int. Cl.
*G06F 1/16*     (2006.01)
*H04N 5/64*    (2006.01)
*H04N 5/225*   (2006.01)

(52) U.S. Cl.
CPC .......... *G06F 1/1686* (2013.01); *G06F 1/1624* (2013.01)

(58) Field of Classification Search
CPC .... G06F 1/1686; G06F 1/1624; G06F 1/1605; G06F 13/102; G06F 1/1067; H04M 1/0237; H04M 1/0264; Y10T 16/5995

(Continued)

(56) References Cited

U.S. PATENT DOCUMENTS

2007/0091555 A1*  4/2007  Lee ............... H04M 1/0237
                                          361/679.02
2010/0022286 A1*  1/2010  Wang ............. H04M 1/0237
                                          455/575.4

(Continued)

FOREIGN PATENT DOCUMENTS

CN         207782890        8/2018
KR      10-2005-0080595     8/2005

(Continued)

OTHER PUBLICATIONS

PCT International Application No. PCT/KR2018/013189, International Search Report (English translation), dated Aug. 5, 2019, 4 pages (Year: 2019).*

(Continued)

*Primary Examiner* — Adrian S Wilson
*Assistant Examiner* — Gage Crum
(74) *Attorney, Agent, or Firm* — Lee Hong Degerman Kang & Waimey (57) ABSTRACT

A display device according embodiment of the present disclosure may include a display main body, an image capturing unit which slides between a first position accommodated inside the display main body and a second position protruding outside the display main body, a guide body provided inside the display main body and slidingly guiding the image capturing unit, and a torsion spring connecting the image capturing unit and the guide body to apply an elastic force to the image capturing unit. The direction of the elastic force applied to the image capturing unit by the torsion spring may change when the image capturing unit passes through a third position located between the first position and the second position.

12 Claims, 11 Drawing Sheets

(58) Field of Classification Search
USPC .................................................. 361/679.01
See application file for complete search history.

(56) References Cited

U.S. PATENT DOCUMENTS

| | | | | |
|---|---|---|---|---|
| 2011/0017000 A1* | 1/2011 | Kim | .................... | H04M 1/0237 |
| | | | | 74/100.1 |
| 2013/0077903 A1* | 3/2013 | Mitsui | .................. | H05K 5/0217 |
| | | | | 384/37 |
| 2020/0064882 A1* | 2/2020 | Chiu | ..................... | G06F 1/1656 |
| 2020/0209914 A1* | 7/2020 | Franke | ................. | H05K 5/0217 |
| | | | | 384/37 |

FOREIGN PATENT DOCUMENTS

| | | | | | |
|---|---|---|---|---|---|
| KR | 10-2014-0103578 | | 8/2014 | | |
| KR | 10-2014-0107008 | | 9/2014 | | |
| KR | 10-2016-0034748 | | 3/2016 | | |
| KR | 20160034748 A | * | 3/2016 | ............... | G06F 1/16 |

OTHER PUBLICATIONS

PCT International Application No. PCT/KR2018/013189, International Search Report dated Aug. 5, 2019, 4 pages.

* cited by examiner

DISPLAY DEVICE

CROSS-REFERENCE TO RELATED APPLICATIONS

This application is the National Stage filing under 35 U.S.C. 371 of International Application No. PCT/KR2018/013189, filed on Nov. 1, 2018, the contents of which are hereby incorporated by reference herein its entirety.

TECHNICAL FIELD

The present disclosure relates to a display device, and more particularly, to a display device including an image capturing unit.

BACKGROUND ART

A display device is a device that displays image information received from the outside of image information stored therein, and representative examples thereof include a television, a monitor, a laptop, or the like.

The display device may include a camera module. The camera of the camera module may provide a function of capturing a real-time image of a user in tasks such as video chat (webcam function), a function of capturing a still image similar to that of a general camera, or the like.

The display device disclosed in Prior Document KR 10-2014-0005734A includes a spring, a latch, and a damper, and a configuration capable of a pop-up operation of a video communication camera in a push up/down manner is disclosed therein.

However, in the display device disclosed in the prior document KR 10-2014-0005734A, there is a problem that a latch and a damper are disposed inside the pull-in part in which the video communication camera is accommodated, so that the size of the pull-in part is increased, the structure is complicated so that assembly is difficult and the cost is high.

In addition, the method in which the camera is pushed up/down by the latch and the damper as described above has a problem in that there is a high possibility of occurrence of defects when a cable connected to the camera is working, and the work man-hour is increased due to a narrow space.

DISCLOSURE

Technical Problem

An object to be solved by the present disclosure is to provide a display device in which an image capturing unit is popped up from a display main body by a simple structure that does not include a latch and a damper.

Technical Solution

A display device according to an embodiment of the present disclosure may include a display main body, an image capturing unit which slides between a first position accommodated inside the display main body and a second position protruding outside the display main body, a guide body provided inside the display main body and slidingly guiding the image capturing unit, and a torsion spring connecting the image capturing unit and the guide body to apply an elastic force to the image capturing unit. The direction of the elastic force applied to the image capturing unit by the torsion spring may change when the image capturing unit passes through a third position located between the first position and the second position.

The torsion spring may act elastic force in a direction in which the image capturing unit slides to the first position when the image capturing unit is located between the first position and the third position, and the torsion spring may act elastic force in a direction in which the image capturing unit slides to the second position when the image capturing unit is located between the second position and the third position.

The image capturing unit may slide along a linear trajectory.

The guide body may include a pair of first bodies located opposite to each other with an image capturing unit interposed therebetween and to which the torsion spring is connected, and a second body connecting the pair of first bodies to each other.

The first body may be formed with a first connection part to which one end part of the torsion spring is connected, and the torsion spring may rotate around the first connection part.

A second connection part to which the other end part of the torsion spring is connected may be provided to the image capturing unit.

The second connection part may be located inside the first connection part when the image capturing unit is located in the first position, and the second connection part may be located outside the first connection part when the image capturing unit is located in the second position.

A guide groove formed long in the sliding direction of the image capturing unit may be formed between the first body and the second body, and a protrusion inserted into the guide groove may be formed in the image capturing unit.

An outer end part of the guide groove may be opened.

In the image capturing unit, a limiter protruding toward the second body may be formed, in the second body, an engaging groove formed long in the sliding direction of the image capturing unit and into which the limiter is inserted may be formed, and when the image capturing unit is located in the second position, the limiter may be engaged with the outer end part of the engaging groove.

The length of the guide groove may be longer than the length of the engaging groove.

The image capturing unit may be provided with a cushion part including an elastic material, and the guide body may be provided with a seating part in contact with the cushion part.

The image capturing unit may include a camera module to which a cable is connected, a rear casing on which a camera module seating part on which the camera module is seated is formed and which covers the camera module from the rear, and a front body fastened to the rear casing and covering the camera module from the front.

At least one cable guide for fixing the cable may be formed on the rear casing.

A cable through-hole through which the cable passes may be formed between the rear casing and the front body.

Advantageous Effect

According to a preferred embodiment of the present disclosure, the position of the image capturing unit may be fixed to the first position or the second position by the torsion spring. In other words, since the torsion spring can simultaneously serve as the existing latch and the elastic member, the configuration of the image capturing unit is simplified, thereby making the image capturing unit compact in size, easy assembly, and reducing manufacturing cost. In addition, since the configuration of the image capturing unit is simplified, the workability of a cable connected to the camera module can be improved.

In addition, the torsion spring can slide in a direction intended by the user only when an external force is applied enough to pass through the third position. Accordingly, it is possible to prevent the image capturing unit from sliding due to an operation or mistake not intended by the user.

In addition, since the image capturing unit connected to the torsion spring slides along a linear trajectory, there is an effect that a direction of elastic force applied by the torsion spring to the image capturing unit varies depending on the position of the image capturing unit. In addition, compared to the case of sliding along a curved trajectory, there is an advantage of simplifying the configuration and operation of the image capturing unit.

In addition, since the protrusion of the image capturing unit moves along the guide groove of the guide body, the sliding of the image capturing unit may be guided.

In addition, since the outer end part of the guide groove is opened, the protrusion of the image capturing unit can be easily inserted into the guide groove of the guide body.

In addition, since the limiter of the image capturing unit is engaged with the engaging groove of the guide body, it is possible to prevent the image capturing unit from being separated from the guide body.

In addition, since a cushion part is provided in the image capturing unit and a seating part in contact with the cushion part is provided in the guide body, when the image capturing unit slides to the first position, the shock applied to the image capturing unit can be minimized. In addition, since the cushion part replaces the role of the existing damper gear, the configuration of the image capturing unit can be simplified.

In addition, since a cable guide for fixing the cable is formed in the rear casing of the image capturing unit, it is possible to prevent the cable from being tangled or twisted in the image capturing unit when the image capturing unit slides.

BEST MODE

Hereinafter, specific embodiments of the present disclosure will be described in detail together with the drawings.

Figure 1:
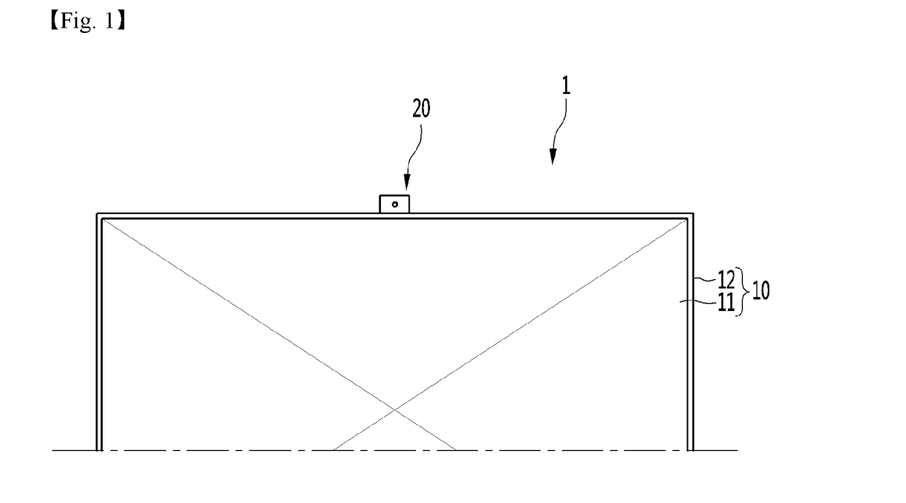
FIG. 1 is a view illustrating a state where an image capturing unit of a display device according to an embodiment of the present disclosure protrudes to the outside.
Figure 2:
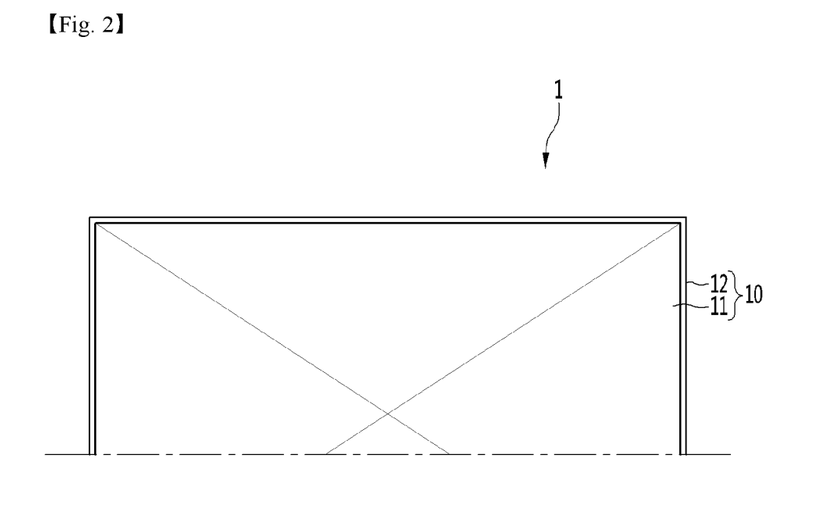
FIG. 2 is a view illustrating a state where the image capturing unit of the display device according to an embodiment of the present disclosure is accommodated therein.

FIG. 1 is a view illustrating a state where an image capturing unit of a display device according to an embodiment of the present disclosure protrudes to the outside, and FIG. 2 is a view illustrating a state where the image capturing unit of the display device according to an embodiment of the present disclosure is accommodated therein.

The display device 1 according to an embodiment of the present disclosure may be a TV, a monitor, a laptop, or the like but is not limited to a specific product.

The display device 1 according to an embodiment of the present disclosure may include a display main body 10 and an image capturing unit 20.

The display device 10 may include a display panel 11 on which a video image is displayed, and a display housing 12 on which the display panel 11 is mounted.

The display panel 11 may be disposed toward the front. The display panel may be fastened to the display housing in front of the display housing.

The display housing 12 may cover the circumference of the display panel 11.

The image capturing unit 20 may be accommodated in the display main body 10 or protrude to the outside of the display main body 10 according to a user's manipulation.

The image capturing unit 20 may perform a camera or webcam function, but is not limited thereto. The lens 21A (refer to FIG. 11) of the image capturing unit 20 may face forward like the display panel 11.

The image capturing unit 20 may be stored in a state of being accommodated in the display main body 10 during normal times. Accordingly, the image capturing unit 20 can be safely protected from external shocks or the like. In addition, when the image capturing unit 20 is required to be used, the user may operate the image capturing unit so that the image capturing unit 20 protrudes from the display main body 10.

Hereinafter, a case where the image capturing unit 20 protrudes upward from the display main body 10 will be described as an example. However, the present disclosure is not limited thereto, and the image capturing unit 20 may protrude to the left side or the right side of the display main body 10.

Figure 3:
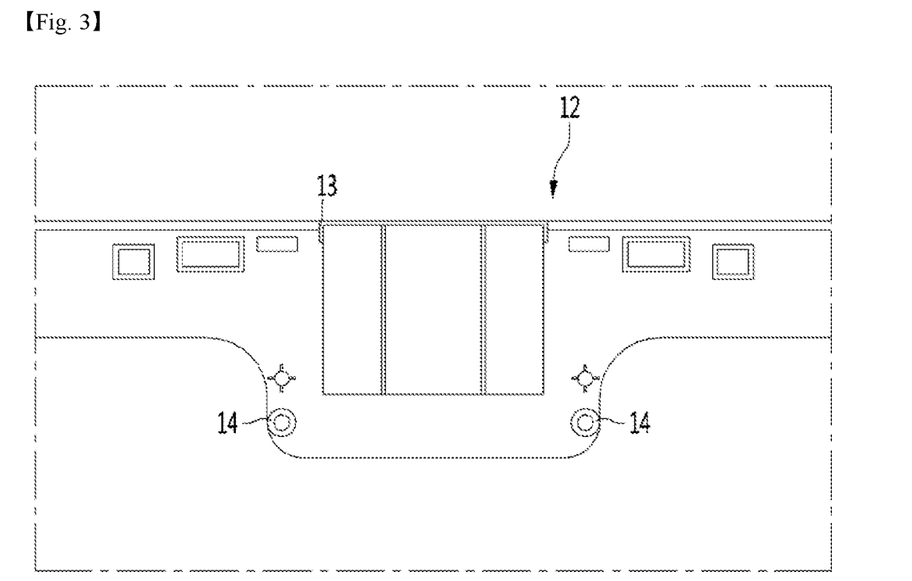
FIG. 3 is a view illustrating a part of a rear surface of a display housing according to an embodiment of the present disclosure.
Figure 4:
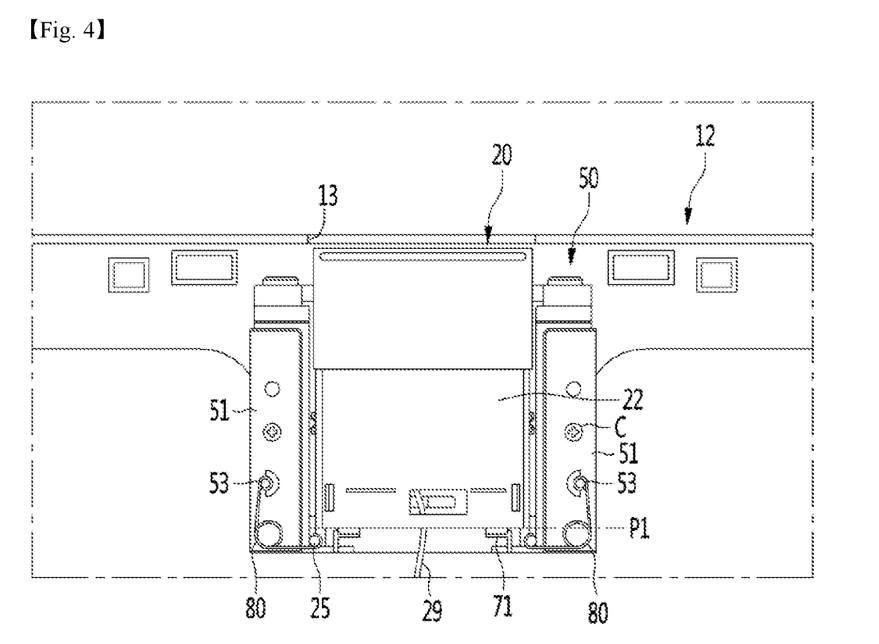
FIG. 4 is a view illustrating a state where the image capturing unit and the guide body are mounted on the display housing.
Figure 5:
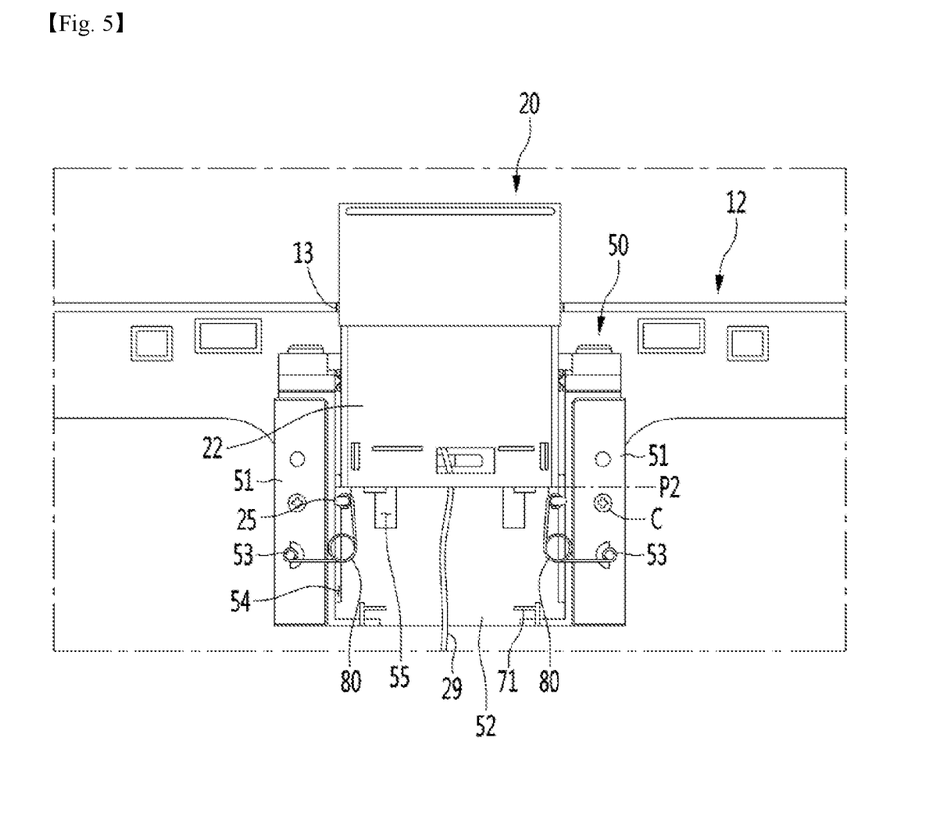
FIG. 5 is a view illustrating a state where the image capturing unit illustrated in FIG. 4 protrudes outside the display main body.

FIG. 3 is a view illustrating a part of a rear surface of a display housing according to an embodiment of the present disclosure, FIG. 4 is a view illustrating a state where the image capturing unit and the guide body are mounted on the display housing, and FIG. 5 is a view illustrating a state where the image capturing unit illustrated in FIG. 4 protrudes outside the display main body.

A passage groove 13 through which the image capturing unit 20 passes may be formed on the outer circumference of the display housing 12. The passage groove 13 may be formed by cutting a part of the outer circumference of the display housing 12. For example, the passage groove 13 may be formed by cutting a part of the upper side of the outer circumference of the display housing 12.

The image capturing unit 20 may protrude to the outside of the display main body 10 through the passage groove 13 or may enter the inside of the display main body 10.

A guide body fastening part 14 to which the guide body 20 is fastened may be formed in the display housing 12. The guide body fastening part 14 may be formed on the rear surface of the display housing 12. In more detail, the guide body fastening part 14 may include a pair of fastening bosses protruding rearward from the rear surface of the display housing 12.

The display device 1 according to an embodiment of the present disclosure may further include a guide body 50 and a torsion spring 80.

The guide body 50 may be provided inside the display main body 10. The guide body 50 may be disposed of behind the rear surface of the display housing 12.

The guide body 50 may guide the sliding of the image capturing unit 20.

The guide body 50 may be fastened to the guide body fastening part 14 formed in the display housing 12.

In more detail, a fastening hole 51A (see FIG. 6) may be formed in the guide body 50. A fastening member C such as a screw may pass through the fastening hole and be fastened to the guide body fastening part 14 of the display housing 12. Accordingly, the guide body 50 may be fastened to the display housing 12.

The sliding of the image capturing unit 20 may be guided by the guide body 50. The image capturing unit 20 is guided by the guide body 50 and can slide along a linear trajectory. For example, the image capturing unit 20 may slide in the vertical direction.

The image capturing unit 20 may slide between a first position P1 accommodated in the display main body 10 and a second position P2 protruding outside the display main body 10.

The second position P2 may be outside the first position P1 in the sliding direction of the image capturing unit 20. For example, when the image capturing unit 20 slides vertically, the second position P2 may be higher than the first position P1.

In more detail, when the lower end part of the image capturing unit 20 is located at the first position P1, the upper end part of the image capturing unit 20 may be located inside the outer circumference of the display housing 12 and the entire image capturing unit 20 may be accommodated in the display main body 10.

When the lower end part of the image capturing unit 20 is located at the second position P2, the upper end part of the image capturing unit 20 may be located outside the outer circumference of the display housing 12 and at least a part of the image capturing unit 20 may protrude to the outside of the display main body 10.

The detailed configuration of the image capturing unit 20 will be described later in detail.

The image capturing unit 20 may be connected to the guide body 50 by a torsion spring 80. In more detail, both end parts of the torsion spring 80 may be connected to the first connection part 53 formed on the guide body 50 and the second connection part 25 formed on the image capturing unit 20, respectively.

A pair of torsion springs 80 may be provided.

The torsion spring 80 may prevent the image capturing unit 20 from stopping at a position other than the first position P1 or the second position P2. In more detail, when the image capturing unit 20 is located at an arbitrary point between the first position P1 and the second position P2, the torsion spring 80 can apply an elastic force to the image capturing unit 20 so that the image capturing unit 20 is moved to the first position P1 or the second position P2.

Figure 6:
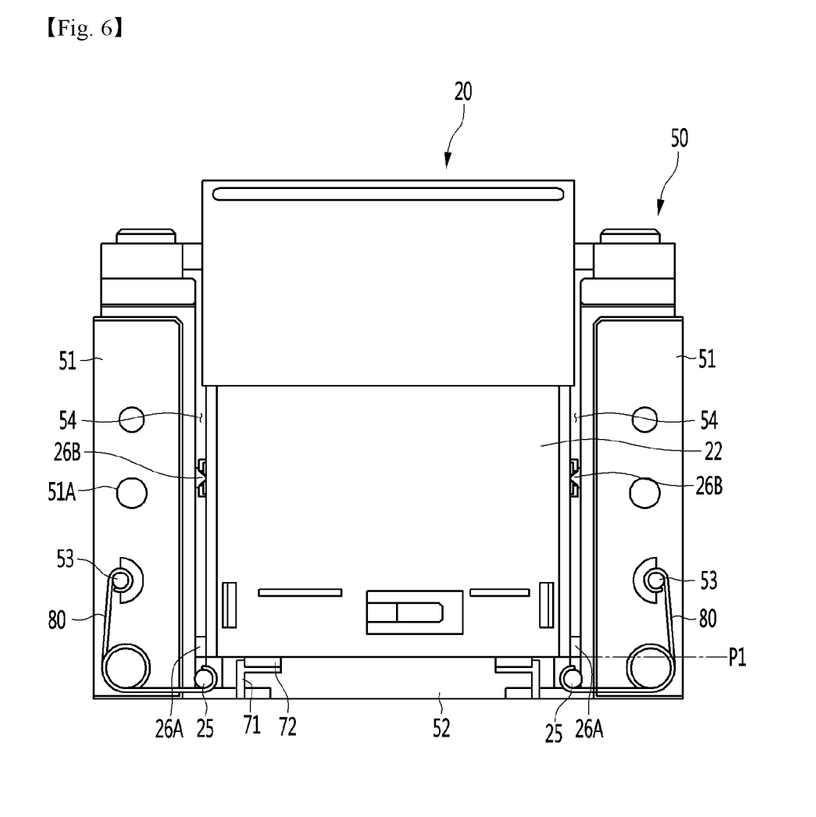
FIG. 6 is a rear view illustrating a state where the image capturing unit according to an embodiment of the present disclosure is located in a first position.
Figure 7:
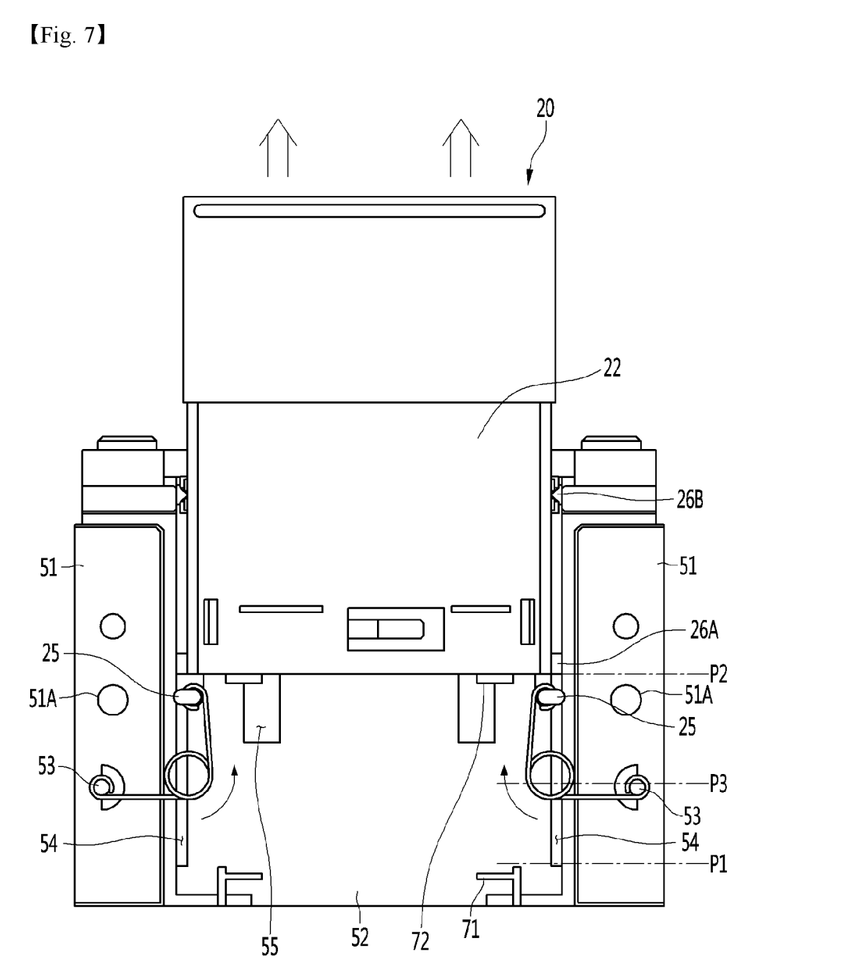
FIG. 7 is a rear view illustrating a state where the image capturing unit according to an embodiment of the present disclosure is located in a second position.
Figure 8:
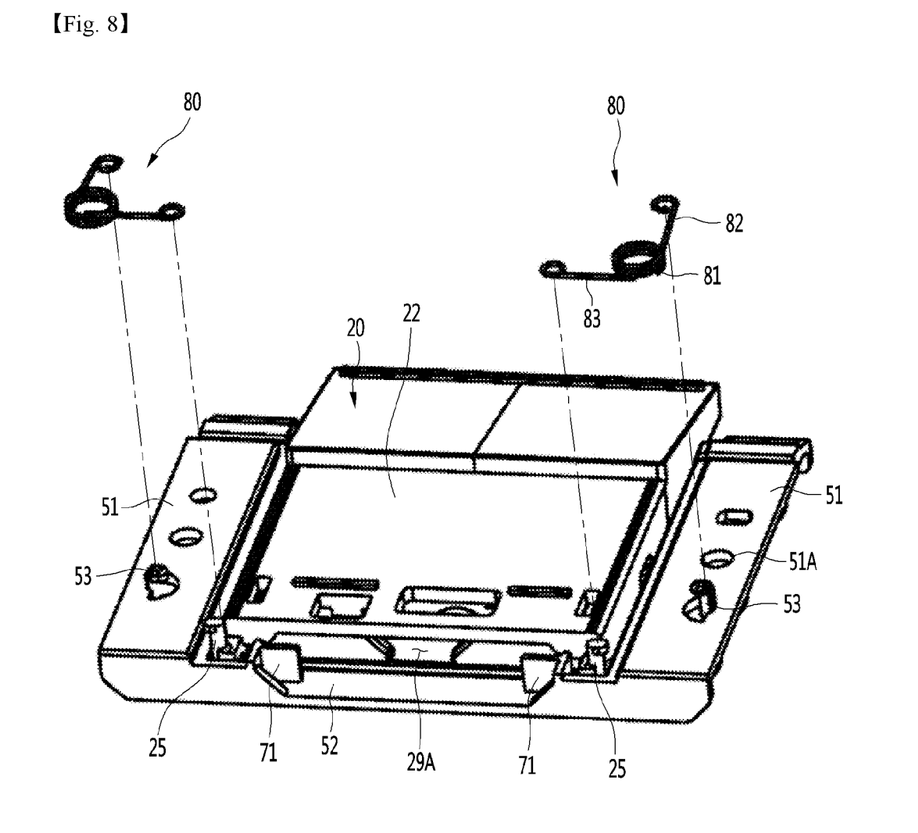
FIG. 8 is a view illustrating a connection relationship between the image capturing unit and a guide body according to an embodiment of the present disclosure.
Figure 9:
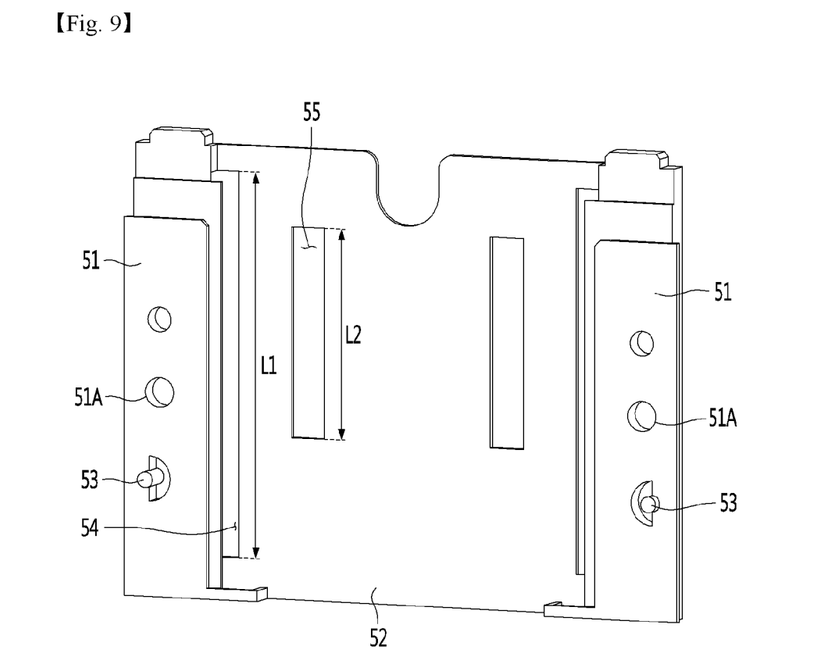
FIG. 9 is a rear view illustrating the guide body according to an embodiment of the present disclosure.

FIG. 6 is a rear view illustrating a state where the image capturing unit according to an embodiment of the present disclosure is located in a first position, FIG. 7 is a rear view illustrating a state where the image capturing unit according to an embodiment of the present disclosure is located in a second position, FIG. 8 is a view illustrating a connection relationship between the image capturing unit and a guide body according to an embodiment of the present disclosure, and FIG. 9 is a rear view illustrating the guide body according to an embodiment of the present disclosure.

The guide body 50 may include a pair of first bodies 51 located opposite to each other with the image capturing unit 20 interposed therebetween, and a second body 52 connecting the pair of first bodies 51 to each other.

For example, the pair of first bodies 51 may be located on the left side and the right side of the image capturing unit 20, respectively.

The first body 51 may be formed long in the sliding direction of the image capturing unit 20, and the image capturing unit 20 may slide between a pair of first bodies 51. The first body 51 may directly guide the sliding operation of the image capturing unit 20, but is not limited thereto.

The second body 52 may connect a pair of first bodies 51. The second body 52 may have a vertical plate shape.

The second body 52 may be located in front of the image capturing unit 20. In other words, the rear surface of the second body 52 may face the front surface of the image capturing unit 20.

A guide groove 54 may be formed between the first body 51 and the second body 52. The guide groove 54 may be formed long in the sliding direction of the image capturing unit 20.

Since a pair of the first body 51 is provided, a pair of guide grooves 54 may also be formed.

Each guide groove 54 may face the outer surface of the image capturing unit 20. For example, one of the guide grooves 54 may face the left surface of the image capturing unit 20, and the other guide groove 54 may face the right surface of the image capturing unit 20.

Protrusions 26A and 26B inserted into the guide groove 54 may be formed in the image capturing unit 20. As the protrusions 26A and 26B move along the guide groove, the sliding of the image capturing unit 20 can be guided by the guide body 50. In addition, since the protrusions 26A and 26B are inserted into the guide groove 54, the image capturing unit 20 may be constrained to the guide body 50 in the front and rear direction.

The protrusions 26A and 26B may protrude from the outer surface of the image capturing unit 20 toward the guide groove 54. For example, the protrusions 26A and 26B may be formed to protrude left and right from the image capturing unit 20.

The protrusions 26A and 26B may include a first protrusion 26A and a second protrusion 26B spaced apart from the first protrusion 26A.

The second protrusion 26B may be located outside the first protrusion 26A in the sliding direction of the image capturing unit 20. For example, the second protrusion 26B may be located above the first protrusion 26A.

A pair of the first protrusions 26A and a pair of the second protrusions 26B may be provided. For example, a first protrusion 26A and a second protrusion 26B may be formed on the left surface and the right surface of the image capturing unit 20, respectively.

The first protrusion 26A and the second protrusion 26B can be formed in a positon which is kept in a state of being inserted in the guide groove 54 while the image capturing unit 20 slides from the first position P1 to the second position P2.

Accordingly, it is possible to prevent the image capturing unit 20 from rotating around the guide body 50. However, one protrusion is formed on the left and right sides, respectively, and the protrusion is formed long in the slide direction of the image capturing unit 20 to prevent rotation of the image capturing unit 20. However, it is more preferable that the protrusions 26A and 26B include the first protrusion 26A and the second protrusion 26B in terms of weight, cost, and material of the image capturing unit 20.

The guide groove 54 may be opened outward in the sliding direction of the image capturing unit 20. For example, the upper end of the guide groove 54 may be opened. In this case, a limiter 27 (refer to FIG. 11) may be formed in the image capturing unit 20 to prevent the image capturing unit 20 from escaping upward from the guide body 50.

Figure 11:
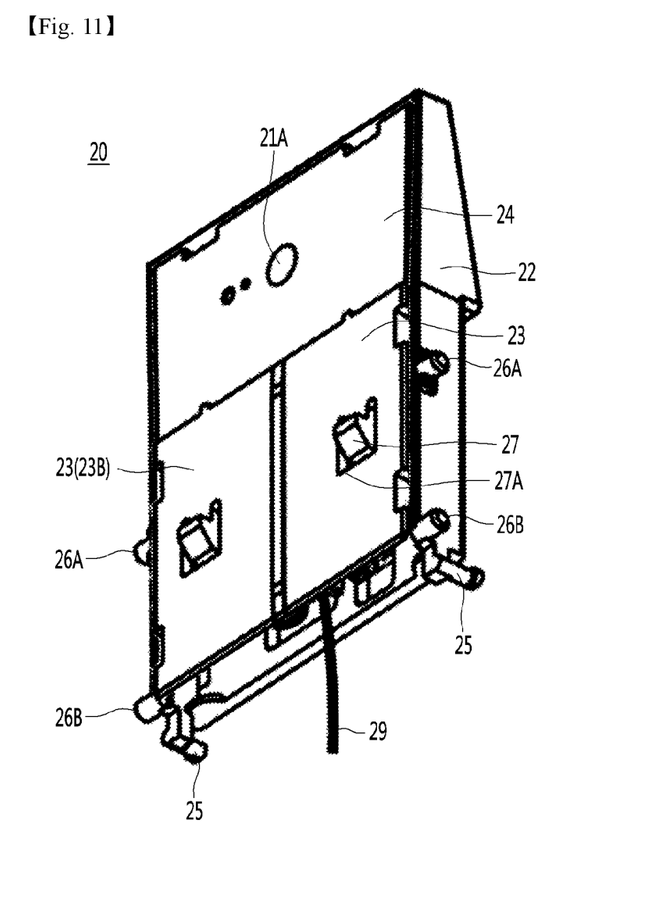
FIG. 11 is a perspective view illustrating the front of the image capturing unit according to an embodiment of the present disclosure.

The limiter 27 may be formed to protrude from the image capturing unit 20 toward the second body 52 of the guide body 50. In other words, the limiter 27 may be formed to protrude forward from the front of the image capturing unit 20.

The guide body 50 may be provided with an engaging groove 55 into which the limiter 27 is inserted. In more detail, the engaging groove 55 may be formed in the second body 52. The engaging groove 55 may face the front of the image capturing unit 20.

The engaging groove 55 may be formed long in the sliding direction of the image capturing unit 20.

At least one engaging groove 55 may be formed. For example, two engaging grooves 55 may be formed.

The limiter 27 may be maintained in a state of being inserted into the engaging groove 55 while the image capturing unit 20 slides from the first position P1 to the second position P2.

When the image capturing unit 20 is located at the second position P2, the limiter 27 may be engaged with the outer end part of the engaging groove 55. For example, when the image capturing unit sliding in the vertical direction is located in the second position, the limiter 27 may be engaged with the upper end part of the engaging groove 55. Accordingly, it is possible to prevent the image capturing unit 20 from escaping from the guide body 50 upward and to limit the sliding range of the image capturing unit 20.

The length L1 of the guide groove 54 may be longer than the length L2 of the engaging groove 55.

Meanwhile, the torsion spring 80 may connect the image capturing unit 20 and the guide body 50. The torsion spring 80 may be connected to the image capturing unit 20 and the guide body 50 from the rear of the image capturing unit 20 and the guide body 50.

As described above, the torsion spring 80 may prevent the image capturing unit 20 from stopping at a position other than the first position P1 or the second position P2. In more detail, when the image capturing unit 20 is located at an arbitrary point between the first position P1 and the second position P2, the torsion spring 80 may apply an elastic force to the image capturing unit 20 to move the image capturing unit 20 to the first position P1 or the first position P2.

The torsion spring 80 may change the direction of elastic force applied to the image capturing unit 20 when the image capturing unit 20 passes through the third position P3 located between the first position P1 and the second position P2.

In more detail, when the image capturing unit 20 is located between the first position P1 and the third position P3, the torsion spring 80 can apply elastic force in a direction in which the image capturing unit 20 slides to the first position P1. On the other hand, when the image capturing unit 20 is located between the second position P2 and the third position P3, the torsion spring 80 can apply elastic force in a direction in which the image capturing unit 20 slides to the second position P2.

The third position P3 may be a position corresponding to the curved point of the torsion spring 80. When the image capturing unit 20 is located at the third position P3, both end parts of the torsion spring 80 may be located on the same line. For example, when the image capturing unit 20 is located in the third position P3, the first connection part 53 of the guide body 50 and the second connection part 25 of the image capturing unit 20 can be located at the same height in the vertical direction.

The torsion spring 80 includes a coil part 81, a first arm 82 extending from one side of the coil part 81 and connected to the first connection part 53, and a second arm 83 extending from the other side of the coil part 81 and connected to the second connection part 25.

The first arm 82 and the second arm 83 may form a predetermined angle. For example, an angle formed by the first arm 82 and the second arm 83 may be approximately 90 degrees. The end part of the first arm 82 may be connected to the first connection part 53 formed on the guide body 50, and the end part of the second arm 83 can be connected to the second connection part 25 formed on the image capturing unit 20.

As the image capturing unit 20 slides, the second connection part 25 may move relative to the first connection part 53.

When the image capturing unit 20 is located at the first position P1, the second connection part 25 may be located inside the first connection part 53. On the other hand, when the image capturing unit 20 is located at the second position P2, the second connection part 25 may be located outside the first connection part 53.

For example, the second connection part 25 may be located below the first connection part 53 if the image capturing unit 20 is located in the first position P1, and the second connection part 25 may be located above the first connection part 53 if the image capturing unit 20 is located in the second position P2.

Accordingly, the torsion spring 80 may rotate around the first connection part 53.

A pair of torsion springs 80 may be provided, and a pair of the first connection parts 53 and a pair of the second connection part 25 may be provided, respectively.

As an example, anyone first connection part 53 may be formed on the first body 51 located on the left side of the image capturing unit 20, and the other first connection part 53 may be formed on the first body 51 located on the right side of the image capturing unit 20. In this case, a second connection part 25 may be provided at the lower left of the image capturing unit 20, and the other second connection part 25 may be provided at the lower right of the image capturing unit 20. Accordingly, each of the pair of torsion springs 80 may apply an elastic force to the image capturing unit at the lower right end and the lower left end of the image capturing unit 20.

The user may slide the image capturing module 20 so as to protrude to the outside of the display main body 10 by pulling the image capturing module 20 accommodated in the display main body 10. In this case, when the user pulls the image capturing module 20 located in the first position P1 to the third position P3, the image capturing unit 20 can slide to the second position P2 by the elastic force of the torsion spring 80. Therefore, even if the image capturing unit 20 of the first position P1 is pulled by an external force that the user does not intend, the image capturing unit 20 may return to the first position P1 by the elastic force of the torsion spring 80 if the external force applied to the image capturing unit 20 is not enough to pull the image capturing unit to the third position P3.

In addition, the user may slide the image capturing module 20 to be accommodated in the display main body 10 by pressing the image capturing module 20 protruding outside the display main body 10. In this case, when the user presses the image capturing module 20 located in the second position P2 to the third position P3, the image capturing unit 20 may be slid to the first position P1 by the elastic force of the torsion spring 80. Therefore, even if the image capturing unit 20 of the second position P2 is pressed by an external force that the user does not intend, the image capturing unit 20 may return to the second position P2 by the elastic force of the torsion spring 80 if the external force applied to the image capturing unit 20 is not enough to press the image capturing unit to the third position P3.

Meanwhile, the guide body 50 may be provided with a seating part 71, and the image capturing unit 20 may be provided with a cushion part 72 in contact with the seating part 71.

The seating part 71 may be provided on the second body 52 of the guide body 50. In more detail, the seating part 71 may be provided at the lower end of the second body 52. The cushion part 72 may be provided on the bottom surface of the image capturing unit 20.

The cushion part 72 may include an elastic material such as a sponge. When the image capturing unit 20 is located in the first position P1, the cushion part 72 may be seated on and contact the seating part 71.

At least one seating part 71 and a cushion part 72 may be provided, respectively. For example, the seating part 71 and the cushion part 72 may be provided with a pair spaced apart from each other, respectively.

The impact applied to the image capturing unit 20 in the process of sliding the image capturing unit 20 from the second position P2 to the first position P1 by the seating part 71 and the cushion part 72 can be minimized.

Figure 10:
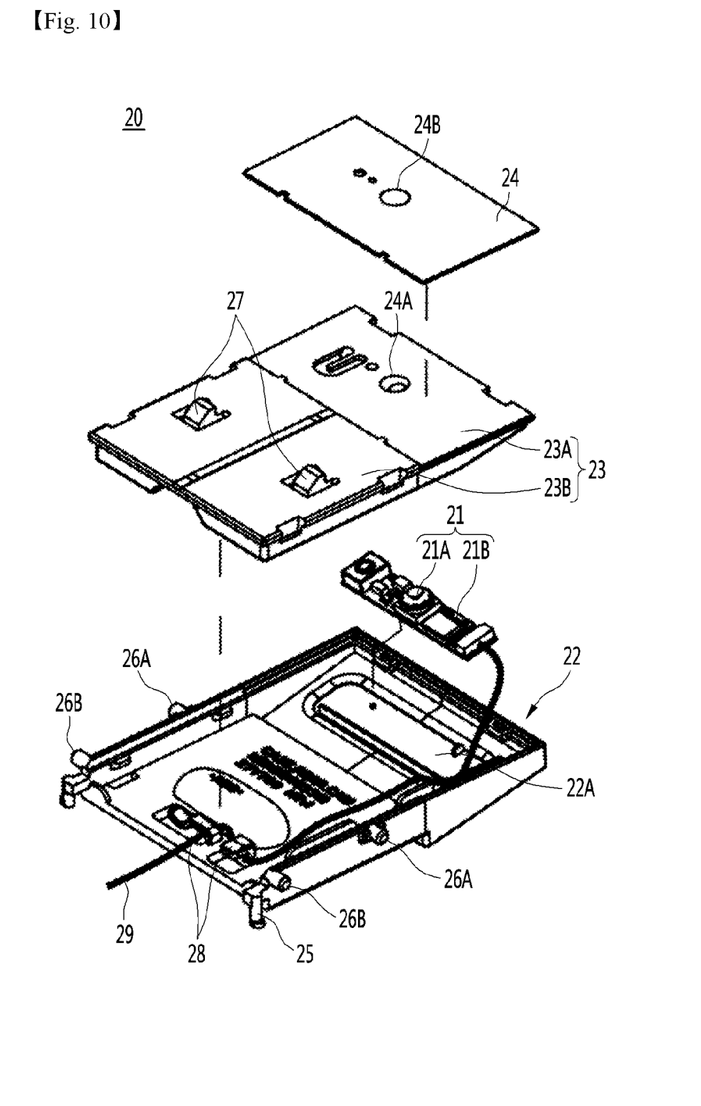
FIG. 10 is an exploded perspective view illustrating an image capturing unit according to an embodiment of the present disclosure.

FIG. 10 is an exploded perspective view illustrating an image capturing unit according to an embodiment of the present disclosure, and FIG. 11 is a perspective view illustrating the front of the image capturing unit according to an embodiment of the present disclosure.

Hereinafter, the configuration of the image capturing unit 20 will be described in detail.

The image capturing unit 20 may include a camera module 21, a rear casing 22, and a front body 23.

The camera module 21 may include a camera 21A and a substrate 21B that controls the camera 21A.

A cable 29 may be connected to the camera module 21, in more detail, to the substrate 21B of the camera module 21. The controller of the display device 1 may control the operation of the camera 21A through the cable 29 or may receive image information or video information input from the camera 21A.

The rear casing 22 may be disposed of behind the camera module 21. A module installation part 22A to which the camera module 21 is installed may be formed in the rear casing 22.

The module installation part 22A may be formed on the rear casing 22.

The rear casing 22 may be provided with protrusions 26A and 26B and the second connection part 25 described above.

The protrusions 26A and 26B may be formed to protrude from the left surface and the right surface of the rear casing 22, respectively.

The second connection part 25 may be formed to protrude downward from the bottom of the left surface and the right surface of the rear casing 22 and extend rearward.

The front body 23 may be fastened to the rear casing 22 and cover the camera module 21 from the front.

The shape of the front body 23 may correspond to the shape of the rear casing 22. The rear surface of the front body 23 may be covered by the rear casing 22. At least a part of the circumference of the front body 23 may be covered by the rear casing 22.

The front body 23 may include an exposed part 23A and a non-exposed part 23B.

When the image capturing unit 20 is located at the first position P1 (see FIG. 7), the exposed part 23A and the non-exposed part 23B may be in a state of being accommodated in the display main body 10.

When the image capturing unit 20 is located in the second position P2 (see FIG. 7), the exposed part 23A may protrude to the outside of the display main body 10, and the non-exposed part 23B is in a state of being accommodated in the display main body 10.

The exposed part 23A may be located outside the non-exposed part 23B in the sliding direction of the image capturing unit 20. For example, the exposed part 23A may be located above the non-exposed part 23B.

The camera module 21, in particular, the camera 21A may be located behind the exposed part 23A. A first through-hole 24A may be formed at a position corresponding to the camera 21A in the exposed part 23A. The through-hole 24A may be formed through the front and rear direction.

A cover 24 may be provided on the front surface of the exposed part 23A. The cover 24 may cover the front surface of the exposed part 23A.

A second through-hole 24B may be formed at a position corresponding to the first through-hole 24A of the exposed part 23A in the cover 24. However, the present disclosure is not limited thereto, and when the cover 24 is formed of a transparent material, the second through-hole 24B may not be formed in the cover 24.

The limiter 27 described above may be formed on the non-exposed part 23B of the front body 23. The limiter 27 may be formed on the front surface of the non-exposed part 23B.

In more detail, a partially cut opening part 27A may be formed on the front surface of the non-exposed part 23B. The limiter 27 may include a hook extending from the outer circumference of the opening part 27A to the inside of the opening part 27A and protruding forward. The hook may be elastically deformed so as to be pushed backward through the opening part 27A. The hook may be configured to be engaged with the end part of the engaging groove 55 (see FIG. 9) when the image capturing unit 20 moves to the second position P2.

When the image capturing unit 20 is assembled to the guide body 50, the protrusions 26A and 26B of the image capturing unit 20 may be inserted into the opened upper end part of the guide groove 54 (see FIG. 9). In this case, the limiter 27 comes into contact with the rear surface of the second body 52 (refer to FIG. 9) of the guide body 50 and may be elastically deformed into the opening part 27A by the elastic force of the hook. Thereafter, when the image capturing unit 20 descends to a depth at which the limiter 27 is inserted into the engaging groove 55 (see FIG. 9), the limiter 27 may be inserted into the engaging groove 55. Thereafter, after the image capturing unit 20 is moved to the first position P1, the torsion spring 80 can be connected to the first fixing part 53 of the guide body 50 and the second fixing part 25 of the image capturing unit 20.

Meanwhile, at least one cable guide 28 for fixing the cable 29 connected to the camera module 21 may be formed on the rear casing 22.

Each cable guide 28 may fix one point of the cable 29. Accordingly, when the image capturing unit 20 slides, the cable 29 can be prevented from being tangled or twisted in the image capturing unit 20.

In addition, a cable through-hole 29A (see FIG. 8) through which the cable 29 passes may be formed in the image capturing unit 20. The cable through-hole 29A may be formed on the bottom surface of the image capturing unit 20.

The cable through-hole 29A may be formed between the rear casing 22 and the front body 23.

The cable 29 connected to the camera module 21 can be easily extended into the display main body 10 by the cable through-hole 29A.

The above description is merely illustrative of the technical idea of the present disclosure, and those of ordinary skill in the art to which the present disclosure pertains will be able to make various modifications and variations without departing from the essential characteristics of the present disclosure.

Accordingly, the embodiments disclosed in the present disclosure are not intended to limit the technical idea of the present disclosure, but to explain the technical idea, and the scope of the technical idea of the present disclosure is not limited by these embodiments.

The scope of protection of the present disclosure should be interpreted by the following claims, and all technical ideas within the scope equivalent thereto should be construed as being included in the scope of the present disclosure.

The invention claimed is:

1. A display device comprising:
a display main body;
an image capturing unit which slides between a first position accommodated inside the display main body and a second position protruding outside the display main body;
a guide body provided inside the display main body and slidingly guiding the image capturing unit, wherein the guide body includes:
a pair of first bodies located opposite to each other with the image capturing unit interposed therebetween, and
a second body connecting the pair of first bodies to each other;
a torsion spring connecting the image capturing unit and the pair of first bodies to apply an elastic force to the image capturing unit;
a camera module to which a cable is connected;
a rear casing including a camera module seating part on which the camera module is seated is formed and which covers the camera module from a rear; and
a front body fastened to the rear casing and covering the camera module from a front,
wherein a direction of the elastic force applied to the image capturing unit by the torsion spring changes when the image capturing unit passes through a third position located between the first position and the second position,
wherein a guide groove formed long in a sliding direction of the image capturing unit is formed between the first body and the second body, and wherein a protrusion inserted into the guide groove is formed in the image capturing unit,
wherein a limiter has a hook extending from the image capturing unit to protrude toward the second body to face the rear of the display device, wherein the hook is elastically deformed to be pushed backward through an opening part of a front body.

2. The display device of claim 1,
wherein the torsion spring acts elastic force in a direction in which the image capturing unit slides to the first position, when the image capturing unit is located between the first position and the third position, and
wherein the torsion spring acts elastic force in a direction in which the image capturing unit slides to the second position, when the image capturing unit is located between the second position and the third position.

3. The display device of claim 1, wherein the image capturing unit slides along a linear trajectory.

4. The display device of claim 1, wherein the first body is formed with a first connection part to which one end part of the torsion spring is connected, and
wherein the torsion spring rotates around the first connection part.

5. The display device of claim 4, wherein a second connection part to which the other end part of the torsion spring is connected is provided to the image capturing unit.

6. The display device of claim 5, wherein the second connection part is located inside the first connection part when the image capturing unit is located in the first position, and wherein the second connection part is located outside the first connection part when the image capturing unit is located in the second position.

7. The display device of claim 1, wherein an outer end part of the guide groove is opened.

8. The display device of claim 1,
wherein, in the second body, an engaging groove is formed, and
wherein when the image capturing unit is located in the second position, the limiter is engaged with an outer end part of the engaging groove.

9. The display device of claim 8, wherein a length of the guide groove is longer than a length of the engaging groove.

10. The display device of claim 1,
wherein the image capturing unit is provided with a cushion part including an elastic material, and
wherein the guide body is provided with a seating part in contact with the cushion part.

11. The display device of claim 1,
wherein at least one cable guide for fixing the cable is formed on the rear casing.

12. The display device of claim 1,
wherein a cable through-hole through which the cable passes is formed between the rear casing and the front body.

* * * * *